(12) United States Patent
Yablokov et al.

(10) Patent No.: US 10,409,987 B2
(45) Date of Patent: Sep. 10, 2019

(54) SYSTEM AND METHOD FOR ADAPTIVE MODIFICATION OF ANTIVIRUS DATABASES

(71) Applicant: Kaspersky Lab ZAO, Moscow (RU)

(72) Inventors: Victor V. Yablokov, Moscow (RU); Oleg V. Nevstruev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 120 days.

(21) Appl. No.: 13/854,096

(22) Filed: Mar. 31, 2013

(65) Prior Publication Data
US 2014/0298470 A1    Oct. 2, 2014

(51) Int. Cl.
*G06F 21/56* (2013.01)
(52) U.S. Cl.
CPC ............ *G06F 21/561* (2013.01); *G06F 21/56* (2013.01)
(58) Field of Classification Search
CPC ...... G06F 21/56; G06F 21/561; G06F 21/563; G06F 21/564
USPC ...................................... 726/22–30
See application file for complete search history.

(56) References Cited

U.S. PATENT DOCUMENTS

| | | | |
|---|---|---|---|
| 6,675,170 B1 | 1/2004 | Flake | |
| 7,203,681 B1 | 4/2007 | Arnold et al. | |
| 7,210,041 B1 | 4/2007 | Gryaznov et al. | |
| 7,310,817 B2 | 12/2007 | Hinchliffe et al. | |
| 7,472,242 B1 * | 12/2008 | Deshmukh et al. | 711/162 |
| 7,472,420 B1 | 12/2008 | Pavlyushchik | |
| 7,478,431 B1 | 1/2009 | Nachenberg | |
| 7,620,991 B2 | 11/2009 | Taneja et al. | |
| 8,161,556 B2 | 4/2012 | Smith et al. | |

(Continued)

FOREIGN PATENT DOCUMENTS

| | | |
|---|---|---|
| EP | 2 560 120 A2 | 2/2013 |
| RU | 2427890 C2 | 4/2012 |
| WO | 2011112348 A1 | 9/2011 |

OTHER PUBLICATIONS

Codd E F: "A relational model of data for large shared data banks", Communications of the ACM, Association for Computing Machinery, Inc, United States, vol. 13, No. 6, Jun. 1, 1970 (Jun. 1, 1970), pp. 377-387, XP002219025, ISSN: 0001-0782, DOI: 10.1145/362384.362685.

(Continued)

*Primary Examiner* — Tamara T Kyle
(74) *Attorney, Agent, or Firm* — Arent Fox LLP; Michael Fainberg

(57) ABSTRACT

Disclosed are systems, methods and computer program products for adaptively modifying antivirus databases. In one example, a system stores in an antivirus database a list of file types and antivirus records for different file types. When the system receives files for performing antivirus analysis, it retrieves from the database the list of file types and uses it to determine file types of the received files. The system then retrieves from the database antivirus lists for the determined file types and uses them to perform antivirus analysis of the files. The system then identifies files with an unknown file type and attempts to determine the file type of these files. The system then updates the antivirus database by (i) adding to the list of file types a new file type corresponding to said unknown file type, and (ii) adding a new empty antivirus list corresponding to said unknown file type.

20 Claims, 7 Drawing Sheets

(56) References Cited

U.S. PATENT DOCUMENTS

| | | | |
|---|---|---|---|
| 2003/0046558 A1* | 3/2003 | Teblyashkin | G06F 21/564 713/188 |
| 2004/0243835 A1* | 12/2004 | Terzis et al. | 713/200 |
| 2005/0021994 A1* | 1/2005 | Barton et al. | 713/200 |
| 2006/0277182 A1* | 12/2006 | Nichols et al. | 707/9 |
| 2007/0056035 A1 | 3/2007 | Copley | |
| 2009/0177514 A1 | 7/2009 | Hudis et al. | |
| 2010/0094817 A1* | 4/2010 | Ben-Shaul et al. | 707/697 |
| 2011/0219451 A1* | 9/2011 | McDougal et al. | 726/23 |
| 2012/0005246 A1* | 1/2012 | Obata | 707/827 |
| 2012/0110667 A1 | 5/2012 | Zubrilin et al. | |
| 2012/0159631 A1 | 6/2012 | Niemela et al. | |
| 2012/0173493 A1 | 7/2012 | Sabbouh | |
| 2012/0173702 A1* | 7/2012 | Szabo | H04L 43/026 709/224 |
| 2012/0311708 A1 | 12/2012 | Agarwal et al. | |
| 2013/0046763 A1* | 2/2013 | Sinclair et al. | 707/737 |
| 2013/0139260 A1* | 5/2013 | McDougal | 726/23 |

OTHER PUBLICATIONS

European search report for European Application 13 193 601.5.

\* cited by examiner

SYSTEM AND METHOD FOR ADAPTIVE MODIFICATION OF ANTIVIRUS DATABASES

TECHNICAL FIELD

The present disclosure generally relates to the field of computer security, and specifically to systems, methods and computer program products for adaptive modification of antivirus databases based on results of antivirus analysis of computer files of different types.

BACKGROUND

In recent years, there has been a marked increase in the number of harmful programs, such as viruses, worms, Trojans and other types of malware. Malware causes significant damage and financial losses to businesses and individual computer users. One of the most effective methods of countering these threats is using antivirus software. Antivirus software detects and removes malicious programs from computers and protects computers and networks from spread of malware. To detect malicious programs, antivirus software performs individual file scans or comprehensive scans of files on computer or network drive.

One of the common methods of malware detection is signature scanning. Usually, in antivirus software, the signature scanning of files is typically carried out using a complete list of the signatures (templates) of harmful code contained in an antivirus database of the antivirus software. The antivirus database constantly increases in size as signature of new type of malware are added to it, which lead to an increase in the time it takes to perform signature scanning. In order to optimize signature scanning method (e.g., to increase the speed of file analysis), it has now become common to perform a preliminary file analysis.

The preliminary analysis enables the main antivirus check to be optimized subsequently, and may consist, for example, of the filtering of the files according to specified criteria; the prioritization of files before checking; the detection of the necessary file parameters for subsequent antivirus checking; and the conversion of files into a specified form. During preliminary analysis, antivirus software uses various evaluation criteria, such as the file type, the hash sum of the file, the file size, the date of creation of the file, the name, and the like. On the basis of the chosen criterion or combination of criteria, the antivirus application detects the files and then performs a preliminary analysis of the detected files according to the specified settings. Thus, for example, if the preliminary analysis consists in the prioritization of files, a file checking sequence is created according to the detected criteria. In another example, if the preliminary analysis consists of file filtering, the files will be filtered (passed for further checking or eliminated) according to the detected criteria.

Cases in which the preliminary analysis involves file filtering are examined below. With this approach, antivirus file analysis can be accelerated by eliminating from the analysis those files that do not match the filter criteria. For example, filtering can be based on the identification of file types and the elimination of safe file types from further checking, because these file types do not require checking. A safe type is a file type among whose files no harmful file and no file containing harmful code has been previously discovered. In other words, the file type in question is a legitimate (or "clean") type.

A further consideration is that antivirus software used in mobile devices is subject to a number of limitations due to the more limited resources of these mobile devices. As a rule, these limitations are due to the operating speed, memory capacity, and period of use of mobile devices, in view of the need to charge their batteries periodically. The aim of the antivirus software is therefore to use the available resources of mobile devices in an efficient manner. For example, the number of technologies used by antivirus software can be reduced by using different methods of preliminary analysis or filtering of files during their antivirus analysis.

Additionally, when preliminary analysis involves filtering by previously chosen file parameters, the speed of antivirus scan can be increased further by dividing the antivirus database according to corresponding file parameters. Thus, antivirus databases containing malware signatures, such as harmful code patterns or hash sums of harmful code or parts thereof. Thus, if such database is divided, for example, by file type, it will be a distributed database enabling the file analysis speed to be optimized (increased), since checking will only take place in a relevant part of the database, rather than across the whole database.

However, it should be taken into account that, given the very large and constantly increasing number of new file types and new patterns (signatures) of harmful code, antivirus databases are also constantly expanding, leading to an increase in antivirus analysis time. Consequently, in order to make efficient use of the advantages of preliminary analysis (filtering) by file type, for example, and the benefits of a distributed antivirus databases, the set of file types used for the preliminary antivirus analysis must be adaptively modified for the computer system on which the antivirus software performs the antivirus analysis of computer files.

SUMMARY

Disclosed are systems, methods and computer program products for adaptively modifying an antivirus database containing information about malicious software objects. In one example embodiment, a system for adaptive modification stores in the antivirus database a list of different object types, such as file types, and antivirus lists for different types of objects, such as files, containing antivirus records. When the system receives software objects, such as computer files, for performing an antivirus analysis, it retrieves from the antivirus database the list of objects types and uses it to determine object types of the received software objects. The system then retrieves from the antivirus database antivirus lists for the determined object types and uses it to perform antivirus analysis of the software objects. The system them analyzes the results of the antivirus analysis to identify at least one software object with an unknown object type. The system determines the object type of the at least one software object with unknown object type, and adaptively modifies the antivirus database by (i) adding to the list of object types a new object type corresponding to said unknown object type, and (ii) adding a new empty antivirus list corresponding to said unknown object type.

The above simplified summary of example embodiment (s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

DETAILED DESCRIPTION OF EXAMPLE EMBODIMENTS

Example embodiments of the present invention are described herein in the context of systems, methods and computer program products for adaptive modification of an antivirus database. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
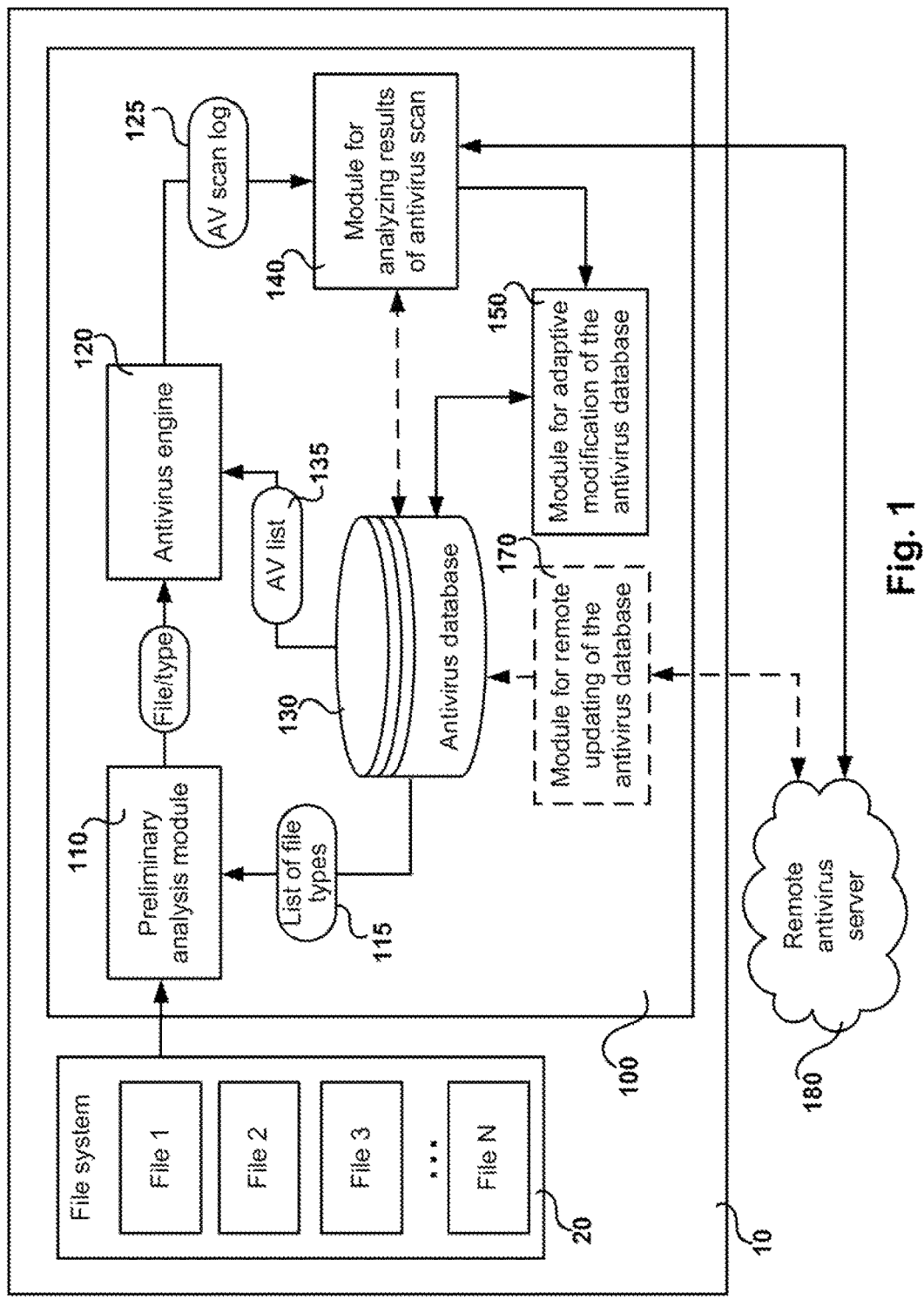
FIG. 1 is a block diagram illustrating one example embodiment of the system for adaptive modification of an antivirus database.

FIG. 1 shows a diagram of one example embodiment of a system for adaptive modification of an antivirus database. The system 100 (hereinafter referred to as an "adaptive modification system" 100) can be implemented as part of an antivirus software deployed on a computing device 10 that has a file system 20, such as personal computer, notebook computer, tablet, smart phone, network server or the like. In one example embodiment, the adaptive modification system 100 includes a preliminary analysis module 110, an antivirus engine 120, an antivirus database 130, a module for analyzing the results of antivirus scan 140, a module for adaptive modification of the antivirus database 150. In one aspect, the adaptive modification system 100 may also include a module for remote updating of the antivirus database 170. It should be noted that although description of various embodiments and aspects of systems and methods for adaptive modification of antivirus database is made with reference to computer files, the systems and methods are not limited to computer files and may be applied to other types of software objects, such as executable and data files, scripts, applets, e-mails, URLs, SMS and MMS message, and other types of software objects.

In one example embodiment, the preliminary analysis module 110 is designed to identify the type of file to be scanned for presence of malware from the file system 20, using a list of file types 115 kept in the antivirus database 130, and to send the identified file type together with the file itself to the antivirus engine 120. It should be noted that it is possible to avoid sending the file to be checked from one module to the other, by simply sending a reference indicating the location of the file to be checked in the file system 20. The list of file types 115 contains a record of different file types (file formats), making it possible to determine precisely the file type to which the file for checking belongs. Each record in the list of file types 115 contains information about various parameters that characterize any given file type. These parameters may include, but not limited to, the file extension, the byte line sequence (the "magic number" or signature), which can be found from the address offset (the quantity indicating the displacement of the memory location relative to the base address used in a relative addressing method) from the start of the file; the metadata (information about the file, which may include information about the file size, the file type, the creation date, and other types of information); the MIME type (a specification for coding information and formatting messages to enable them to be sent over the Internet); parameters of the hardware/software platform on which the files of this type can be executed; and other distinguishing parameters of files known to those of ordinary skill in the art. In another aspect, the preliminary analysis module 110 may identify the type of software/hardware platform on which the system 100 is operating and the location of the file in the file system of the platform on the basis of which the antivirus engine 120 can decide the necessary duration and type of the antivirus analysis.

In one example embodiment, the antivirus engine 120 is configured to perform antivirus analysis (also referred herein as antivirus check or antivirus scan) on the received files and send information about the results of the analysis, in a form of a log of the antivirus scan 125, to the module for analyzing results of the antivirus scan 140. In one aspect, the antivirus analysis of the file may be carried out by calling the antivirus list 135 (hereinafter referred to as the "AV list") from the database 130 corresponding to the type of the file to be checked, and then comparing the file to be checked with the records in the AV list 135, which contains parameters for identifying harmful code in the file. The harmful code parameters may include, but not limited to the signatures of harmful code, hash sum of a file containing harmful code, and various external file attributes, such as file size or creation date.

In one aspect, depending on of the required duration and type of the antivirus analysis, the antivirus engine 120 may perform preliminary unpacking of the archived (e.g., compressed) files or select to perform simpler/faster antivirus analysis methods, such as signature analysis, or more complex antivirus analysis methods, such as, for example, heuristic analysis or emulation. The duration and type of the antivirus analysis may depend on the hardware/software platform on which the system 100 is operating. For example, mobile device platforms, such as Android and Symbian, have limited processing, memory and power resources comparing to, for example, PC-based platforms, such as Windows and Unix. Therefore, on mobile device platforms, the antivirus engine 120 may use faster and simpler antivirus analysis techniques, such as signature matching, and may postpone more complex and time-consuming checks, such as heuristic analysis and emulation, for off-hours when the mobile device is not used. In contrast, on the PC-based platforms, the antivirus engine 120 may select more thorough and time-consuming analysis technique(s), which can be run in the background, without interference with the use of the PC to achieve a comprehensive analysis of the PC.

In another aspect, the duration and type of the antivirus analysis may depend on the location of the file. For example, on some mobile platforms, the antivirus engine 120 may decide whether to perform or cancel the antivirus scan of the files based at least in part on their location in the file system of the mobile OS. The antivirus engine 120 may, for example, first scan files in applications folders followed by the files in system folders. On Android platform, applications (e.g., executable files) are usually installed to the directly folder "/storage/sdcard0/data/app", where "app" is the name of the application, while data files (e.g., media, documents, books, etc.) are stored to the system folder "/storage/sdcard0/DCIM". In one aspect, the antivirus engine 120 may perform a more thorough and time consuming analysis of the application folders and less thorough inspection of data files in system folders.

A distinctive feature of the adaptive modification system 100 is the antivirus database 130. As mentioned above, the antivirus database 130 includes two kinds of data lists, namely a file type list 115 and an AV list 135, which are supplied to the modules 110 and 120 respectively. It should be noted that the AV lists 135 include an AV list for checking files of undetermined types (in other words, files of unknown file types). An unknown file type is a file type which is not recorded in the file type list 115, and therefore this type cannot be identified by the preliminary analysis module 110. The antivirus database 130 contains not only information about file types whose files include harmful code, but also information about safe (legitimate or clean) file types. A safe file type is a file type whose files are not known by the system 100 to contain harmful code. Therefore, the AV lists 135 include AV lists 135 of safe file types, which include, no records about harmful files and which are consequently empty lists. This increases the file checking speed during the scanning of files of safe types from the file system 20. An example of forming the AV list for a safe file type is described below. In one example embodiment, the AV lists 135 are populated and modified using module for remote updating of antivirus database 170. The module 170 for populating the antivirus database 130 sends enquiries at specified intervals to the antivirus server 180 (hereinafter referred to as the "AV server") for the purpose of updating the AV lists 135. If the AV server 180 contains new records of specimens (for example, MD5-hashes) of harmful code, the AV server 180 sends them to the updating module 170, which in turn adds them to the corresponding AV lists. Otherwise, the AV server 180 sends a message indicating the absence of new records.

Another distinctive feature of the antivirus database 130 is that, at the start of operation of the adaptive modification system 100 installed, e.g., on a mobile device, the antivirus database 130 may include in its list of file types 115 records about file types for which no AV lists 135 have been created. AV lists are not created for certain file types, because files of these types do not contain harmful code, and therefore are not considered to be harmful. However, during the operation of the system 100, the antivirus database 130 may be adaptively modified to meet the requirements of the mobile device, e.g., based on the checked files and their identified types. In one aspect, antivirus database 103 may be adaptively modified based on the hardware/software platform on which the system 100 is deployed. For example, for a mobile platform, such as Symbian, the antivirus database 130 may be adaptively modified to store only those types of files that can be executed on this mobile platform.

In one example embodiment, the adaptive modification system 100 also includes a module for adaptive modification of the antivirus database 150. The module 150 is designed to adaptively modify the antivirus database 130 by adding a record of each new file type to the list of file types 115 and creating a corresponding AV list 135, based on decision received from the module for analyzing results of antivirus scan 140. In turn, the module 140 is designed to analyze the information received from the antivirus engine 120 and to make a decision as to the need to modify the antivirus database 130. The information may be sent in the form of a log 125 containing various items of information on the antivirus scan of files from the file system 20. The information contained in the log 125 may be, for example, information about a decision taken in respect of a file to be checked (a harmful file or not), about the file type, about an unknown file type and its characteristics, about the checking time, and the like.

Figure 2:
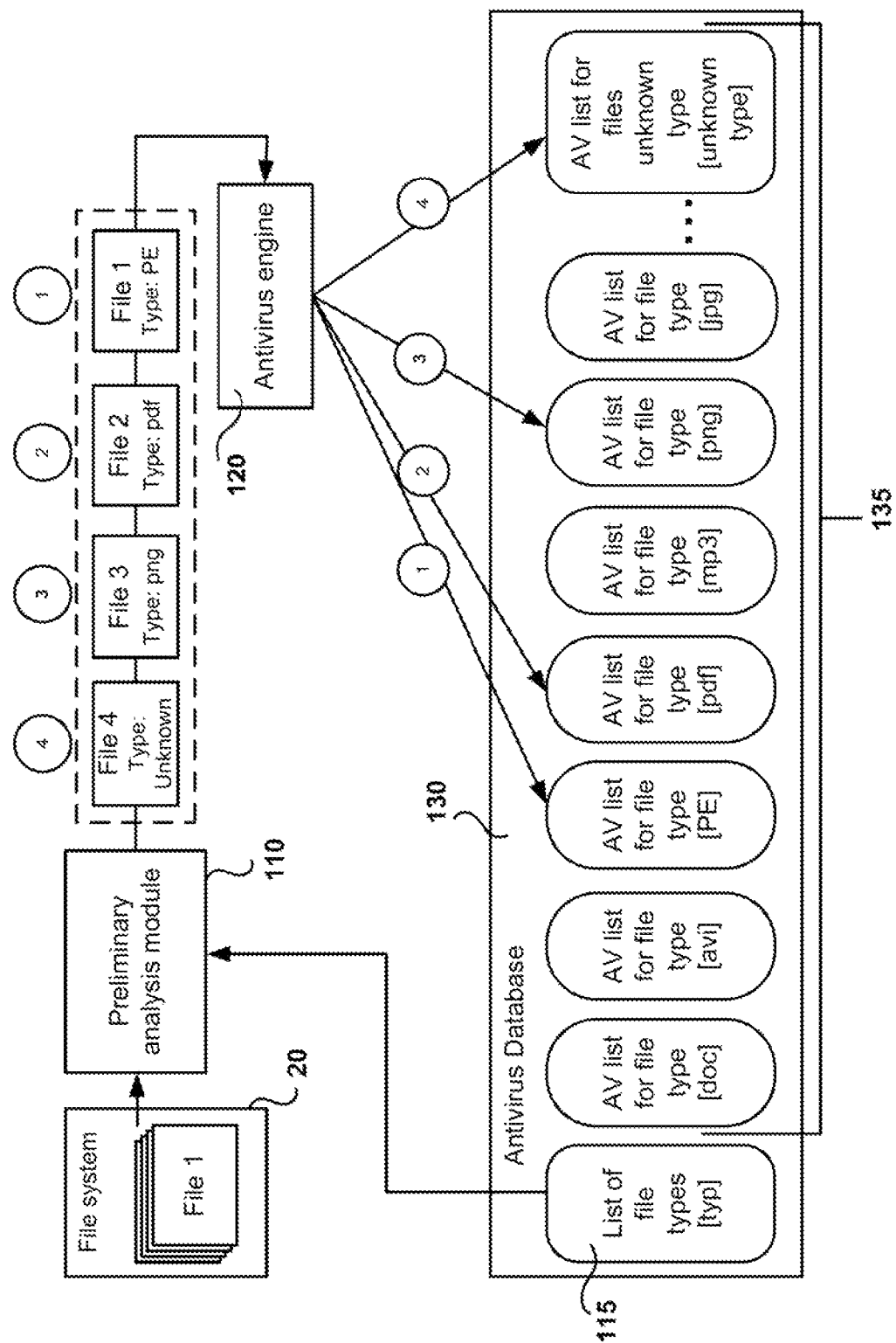
FIG. 2 is a schematic diagram illustrating one example interaction of components of the system for adaptive modification of an antivirus database.

FIG. 2 shows an example flow of interaction of the preliminary analysis module 110, the antivirus engine 120 and the antivirus database 130, and the creation of the AV scan log. When the files from the file system 20 have been checked by the antivirus engine 120 and the AV scan log 125 has been created in accordance with the results of antivirus analysis of the files, the log 125 is sent to the module for analyzing results of AV scan 140. The module 140 performs an analysis of the AV scan log 125, on the basis of which it makes a decision whether to modify the antivirus database 130. If the modification is required, the module for analyzing results of AV scan 140 may send the necessary information to the module for adaptive modification of the antivirus database 150. Otherwise module 140 terminates the operation.

An example of a situation in which the antivirus database 130 may be adaptively modified is when a new file type, e.g., a file type for which no information is contained in the list of file types 115 from the antivirus database 130, has been detected during the analysis of the AV scan log 125. In this case, the module 140 sends the information about the new file type to the module for adaptive modification of the antivirus database 150. Based to the received information, the module 150 creates a new record in the list of file types 115 and creates a new AV list 135 in accordance with the new file type to be stored in the antivirus database 130.

An example of detection of a new file type is via an enquiry sent to the AV server 180, containing the information about the file checking results from the log 125. In turn, the AV server 180 analyzes the received information about the file, and then sends a resulting decision to the module for analyzing results of antivirus scan 140. The decision may contain both information about the file type to which the supplied information corresponds and information about the need to identify the file type. Another aspect of the method of identifying a new file type during the analysis of the AV scan log can be used if the list of file types is to be updated using the module for remote updating of the antivirus database 170. This form of modification of the antivirus database 170 may be performed automatically at previously specified intervals, as described above with regard to the updating of the AV lists 135.

Yet another aspect of the method of detecting a new file type during the analysis of the AV scan log 125 by module 140 is a method for analyzing the file structure. This method is based on an analysis of the file formats, and particularly on an analysis of the specification of the structure of the data recorded in the file. The data structure specification provides a representation of the way in which different fragments of information are distributed within the file. Since there are specifications for many file formats which provide a detailed description of the file structure of the corresponding formats, the module for analyzing results of antivirus scan 140 can analyze the structure of a file identified as belonging to an unknown file type, to establish whether it corresponds to any known file format. If it coincides with any of the known formats, the type of the analyzed file can thus be identified. If it should be noted that the method of file structure analysis may be implemented in the AV server 180. In this case, the module for analyzing results of antivirus scan 140 simply sends enquiries to the AV server 180 concerning files whose type has been identified as an unknown file type, and receives answers containing the result of the analysis conducted in the AV server 180.

Figure 6:
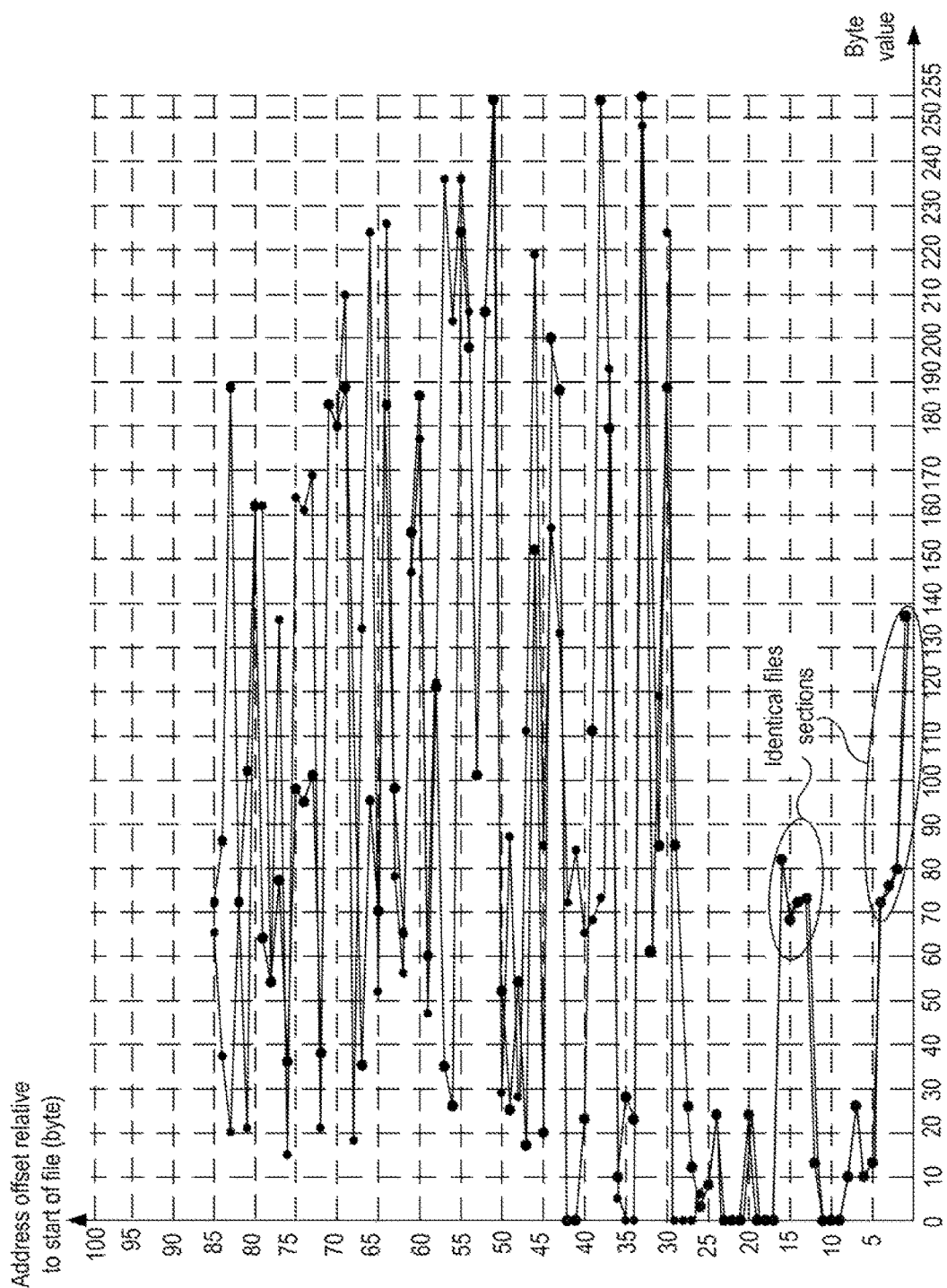
FIG. 6 is a graph illustrating comparison of file contents used by the system for adaptive modification of the antivirus database.
Figure 7:
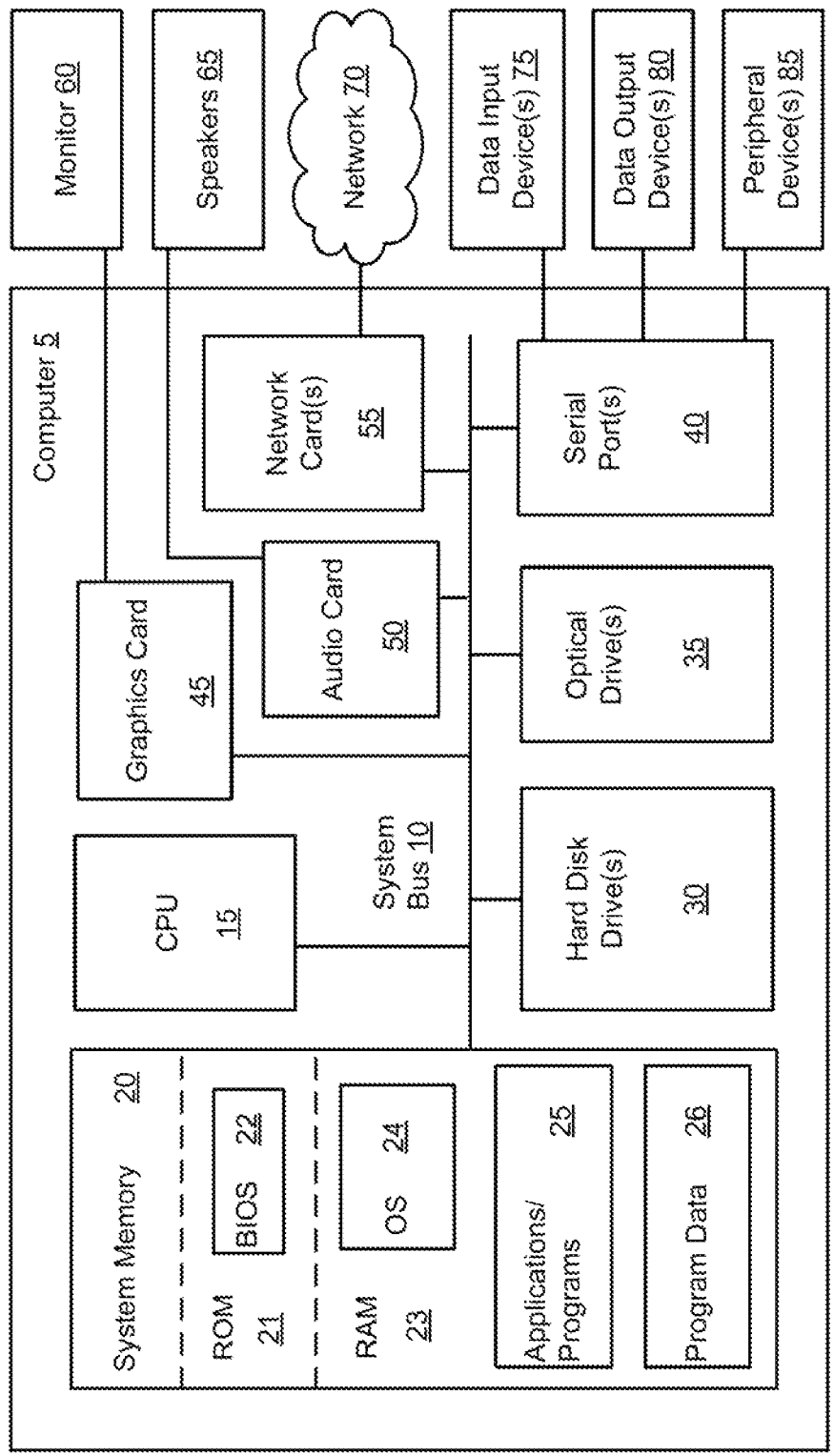
FIG. 7 illustrates a block diagram of a general-purpose computer suitable for implementing a system for adaptive modification of an antivirus database.

Yet another aspect of the method of detection of a new the type during the analysis of the AV scan log 125 by the module for analyzing results of antivirus scan 140 is by comparing the content of files. The method is based on the comparison of the byte values for specified offset and the subsequent detection of similar byte sequences. For example, when the module for analyzing results of antivirus scan 140 detects information in the AV scan log 125 about a number of files whose file type has been identified as an unknown file type. As mentioned above, the module 140 can send an enquiry to the AV server 180, but may receive a negative answer concerning the file type, meaning that the file type has not been identified. The module 140 may then check the file extensions and isolates the files whose file extensions coincide. The file extension is a part of the file name which follows a period and indicates the file type (for example, *.txt, *.exe). If the extensions of two or more files coincide, the module 140 analyzes the file data and may plot the result in the form of a graph as shown in FIG. 6. The graph depicts the distribution of byte values of files as a function of their positions (offset) in the file contents. The module 140 then detects all the characteristic (identical) portions of the file contents. In one example aspect, it is possible to skip portions containing the sequences "00" and "0FFh", which are values in hexadecimal notation (in FIG. 6 the code values are shown in decimal notation and therefore the module 140 ignores values of 0 and 255). An identical file portion is a sequence of bytes composed of two bytes or more and containing the same address offset in all the analyzed files (it should be noted that an example sequence is a sequence of four bytes). If one or more identical portions are detected, a characteristic template for files of this type will be created on the basis of the portion or portions concerned. Otherwise, if it is impossible to detect at least one identical portion in all the analyzed files, the following actions may be taken in relation to the files: a) if the number of files supplied for analysis is 10 or less, the files will be stored until the subsequent analysis of the AV scan log 125 and will be re-analyzed or sent to the AV server 180 for subsequent analysis; b) if the number of files is greater than ten for example, the module 140 repeats analysis of the graph in FIG. 6. After an identical code portion has been found in 80% of all the analyzed files, this group of files is isolated, and a characteristic template for them is created by the module 140 for the detection of files of this type. The remaining files are stored by the module 140 until the subsequent analysis of the AV scan log 125.

The template and information about the file type are sent to the module for adaptive modification of antivirus database 150. The probability of detecting a type (e.g., signature) of the file increases with the number of unknown files of a single type being analyzed.

It should also be noted that, in one example embodiment, the analysis of file's code may be limited to the first 100 bytes of code, since the information about the types (e.g., signatures) of the file is most likely to be located in this part of the code. This conclusion is based on the experience of analyzing different file formats and structures.

Thus, during the update of the list of file types, the antivirus database 130 is populated with AV lists 135 which correspond to the new file types detected locally based on the analysis of scanned files. It should be noted that the new AV lists 135 will be empty lists, because any files of the new type which may contain harmful code are unknown to the system 100. Therefore, the corresponding file types are considered to be legitimate (safe) file types until the module for remote updating of the antivirus database 170 receives records of harmful files of these types from the antivirus server 180. Another example of a method for determining that a file type is unsafe is searching for records about files of the corresponding type in the AV list 135 for unknown file types. If a record of this type is found, it will be transferred to the corresponding AV list, and the file type will become a harmful file type.

Another example of a situation in which the antivirus database 130 may be modified is when during the analysis of the AV scan log 125 by the module for analyzing results of antivirus scan 140, it is found that antivirus analysis of files of safe types takes a significant amount of time (e.g., several seconds). This is due to the fact that the antivirus database 130 initially contains records for harmful files only, and the checking of files of safe types is carried out using the AV list for unknown file types 135, which may contain several times as many records as the other AV lists 135. The significant scan time can be determined, for example, by counting the number of files of safe types checked and the total number of checked files. If the number of checked safe files amounts to 10% or more of the total number of checked files in a given time interval, the module for analyzing results of antivirus scan 140 sends information about the need to create a new AV list for the file type concerned to the module for adaptive modification of database 150. In its turn, the module 150 creates a new AV list 135 for checking files of the aforesaid safe file type. The new AV list 135 may then be added to the antivirus database 130. The time interval in which the count takes place may be specified by the user or may be set automatically. It should be noted that this AV list will be empty; in other words, the files of the file type concerned will not contain any harmful code, and therefore the adaptive modification system 100 can carry out an accelerated check on files of this type.

In one example embodiment, the adaptive modification of the antivirus database 130 can be performed if the module for analyzing results of antivirus scan 140 analyzes a file of a type identified as unknown during the analysis of the AV scan log 125 received from the antivirus engine 120. In this case, the antivirus engine 120 has checked the file of the unknown file type using the AV list for unknown file types (as illustrated in FIG. 2). The decision as to the presence of harmful code is then made, and the results of the check are sent accordingly to the module for analyzing results of antivirus scan 140. If a file is identified as a harmful file and the module 140 has then identified the file type of the harmful file concerned (as described above), the module for adaptive modification of database 150 adds the information about this file type to the list of file types. The module 150 also creates an AV list corresponding to this file type, and adds to it the corresponding record from the AV list for unknown types. Otherwise, if the file is identified as a safe file, the module 150 operates as described previously.

In one example embodiment, after a new AV list has been added to the antivirus database 130, the module for adaptive modification of the antivirus database 150 carries out an analysis of the AV list for unknown file types from the antivirus database 130 to check whether it contains records belonging to the file type corresponding to the new AV list. If such records are detected, they are also added to the new AV list according to one aspect.

In another example embodiment, the module for analyzing results of antivirus scan 140 analyzes the AV list 135 for unknown file types. This analysis is desired because the AV list 135 in question contains records about all files in which the file type has not been identified, and the number of such records increases progressively over time as more new file types are created. The antivirus scanning of files from the file system using the AV list in question may therefore occupy most of the checking operation, leading to an increase in checking time. This is a particularly pressing problem where a large number of files of unknown types are present. An example of the identification of unknown file types is a method identical to the method of identifying a new file type, by module for analyzing results of antivirus scan 140, as described above. Another example is when these file types are recognized and identified over time (as a result of the disclosure of information about file types by companies developing the file types concerned, or specialist research conducted by various competent organizations in order to identify these file types), making it possible to isolate the records for this type in a separate AV list. Let us consider the situation in which the module for analyzing the checking results 140 has received from the AV server 180 some information by means of which it can identify a file type which was previously unidentified. After receiving this information, the module for analyzing results of antivirus scan 140 analyzes the AV list 135 for unknown file types. The analysis is based on the detection of records relating to the file type in question. If at least one record of this type is detected, the device for analyzing the checking results 140 sends the information about the new file type to the module for adaptive modification of the antivirus database 150. The module 150 creates a corresponding AV list in the antivirus database 130. It then transfers the detected record, in which the file type corresponds to the created AV list, from the AV list for unknown file types into the created AV list.

In one aspect, when the adaptive modification system 100 is deployed on a mobile device, the antivirus database 130 may contain only information about the file types and the corresponding AV lists 135 of files containing harmful code. The information about other file types can be added to the database 130 later as such files appear in the file system 20. In another aspect, the antivirus database 130 may initially contain only information about file types associated with the hardware/software platform of the mobile device. For example, such mobile platforms may include, but not limited to Symbian, Android, Windows and IOS.

It is also important to rationalize the use of memory in mobile devices. In another example embodiment, therefore, the creation of new AV lists is permitted only if, during the analysis of the AV scan log 125 and the detection of a new file type, the module for analyzing results of antivirus scan 140 counts the number of checked files of a given type. If the files of this type amount to 10% or more of the total number of checked files in a given time interval, a new AV list is created for checking files of this type. The created AV list is initially empty, because it was created on the basis of an analysis of a safe file type. It is then added to the antivirus database 130. The time interval may be specified by the user or automatically.

Turning back to FIG. 2, which shows interaction of the preliminary analysis module 110, the antivirus engine 120 and the antivirus database 130. It is assumed that antivirus scan is to be carried out on a number of files in the file system 20. The preliminary analysis device 110 analyzes the data of files from the file system 20 using a list of file types 115 obtained from the antivirus database 130. If the file type has been identified, a corresponding note is made about the detected file type; for example, "file 1, type PE; file 2, type PDF; file 3, type PNG". Otherwise, a note is made to the effect that the analyzed file is unknown; for example, "file 4, type unknown". The preliminary analysis device 110 then sends the file with the detected file type to the antivirus engine 120. The antivirus engine 120 retrieves an AV list from the antivirus database 130 corresponding to the detected file type and performs antivirus analysis (e.g., signature analysis) of the received files. Thus, for example, the PE file type (executable file format) was found for file 1. The antivirus engine 120 therefore retrieves an AV list for the PE file type. The antivirus engine 120 compares the file with records from the corresponding AV list. If correspondences are found, the file is malicious. Otherwise, the file is safe. If the file type has been identified as a safe file type (such as PNG), the file analysis will consist of retrieving the corresponding AV list, and then, since this AV list is empty, classifying the file as a safe. If the file type unknown, the AV list for unknown file types is retrieved. After the files have been checked against this AV list, the results of the antivirus analysis are sent to the module for analyzing results of antivirus scan 140. In one example embodiment, the antivirus scan results are sent to the module 140 only if a file of an unidentified type is being analyzed. It should be noted that the AV lists are not limited by the file types mentioned hereinabove.

Figure 3:
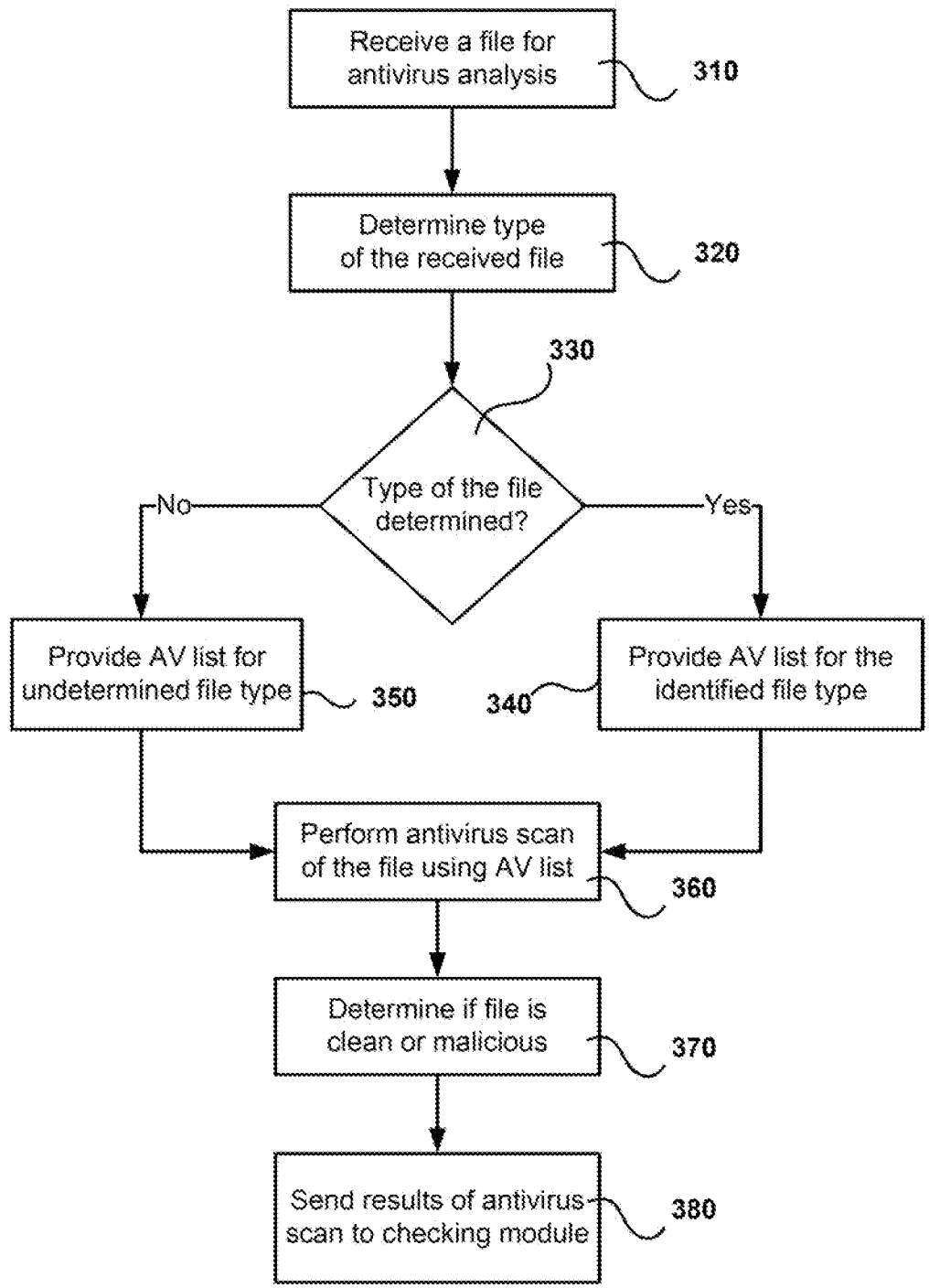
FIG. 3 is a flow diagram illustrating one example method of operation of the system for adaptive modification of an antivirus database.
Figure 4:
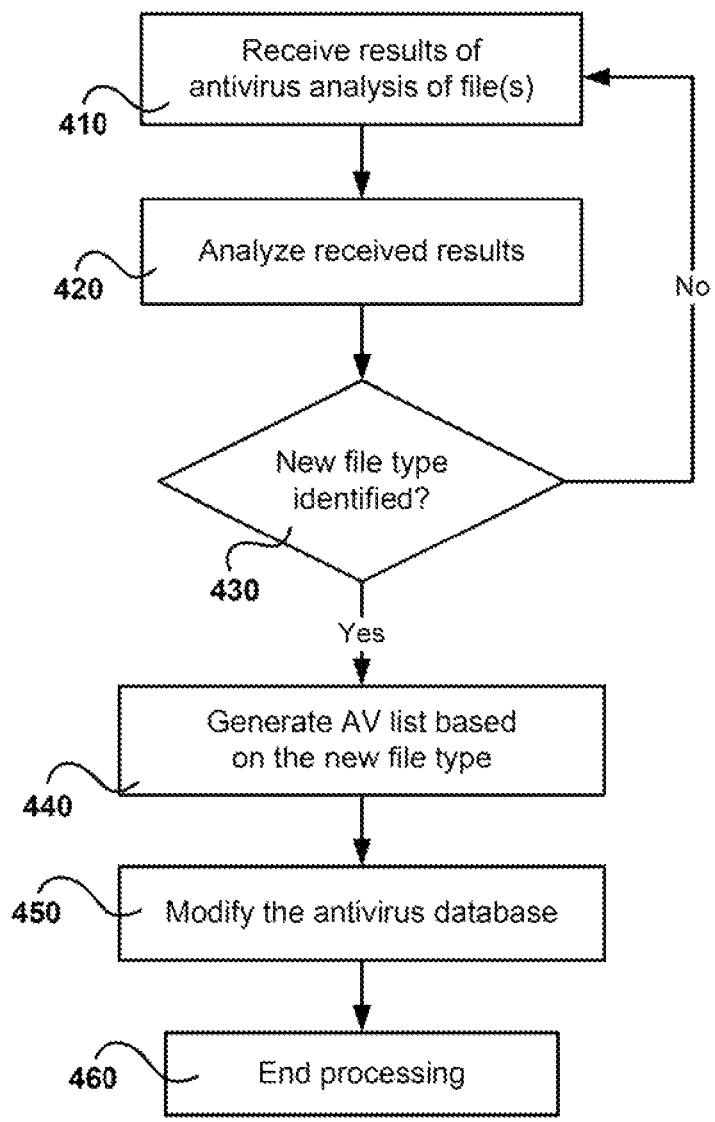
FIG. 4 is a flow diagram illustrating one example method of analysis of antivirus scan results for adaptive modification of the antivirus database.

FIG. 3 shows one example method of operation of the system for adaptive modification of an antivirus database. In step 310, the preliminary analysis device 110 receives a pointer to a file from the file system 20, which is to be checked for the presence of harmful code. In step 320, the preliminary analysis device 110 searches for correspondences between a previously created distinguishing feature of the file to be checked and the records contained in a list of file types stored in the antivirus database 130. If correspondences are found, the file type of the file to be checked is identified in step 330. Otherwise, if no correspondences are found, the file type is identified as an unknown file type in step 330. The file, with its identified type, is then sent to the antivirus engine 120. If the type has been identified, the AV list is supplied in step 340 in accordance with the identified type from the antivirus database 130. If the type has not been determined (in other words, if the file type is unknown), the AV list for unknown file types is supplied in step 350 from the antivirus database 130. It should be noted that this AV list may include records (e.g., signatures) for various file types which have not been identified. In step 360, the antivirus engine 120 compares the records from the received AV list with those of the received file. The decision regarding the presence of harmful code in the file is then taken in step 370. If correspondences are found, the file is harmful. Otherwise, the ile is safe. Then, in step 380, the results of the checking are sent to the module for analyzing results of antivirus scan 140. The analysis of the checking results is illustrated in FIG. 4. In one example embodiment, the checking results are sent to the module for analyzing results of antivirus scan 140 only if the file type has not been identified.

FIG. 4 shows one example method of analysis of antivirus scan results for adaptive modification of the antivirus database. In step 410, the module for analyzing results of antivirus scan 140 receives AV scan log 125 from the antivirus engine 120, and it analyzes results of the antivirus scan contained in the log 125 at step 420. In step 430, the module 140 identifies the file type relating to the file whose type was initially identified as unknown. As explained above, one example of the identification of the file type is an enquiry to the AV server 180, which contains information about the file checking results. In turn, the AV server 180 analyzes the received information about the files, and then sends the decision that was taken to the module for analyzing results of antivirus scan 140. The decision may contain both information about the file type to which the supplied information corresponds and information about the need to identify the file type. Another example of the identification of a file type during the analysis of the AV scan log 125 is by using the list of file types provided using module for remote updating of the antivirus database 170. Yet another example of the detection of a new file type during the analysis of the AV scan log 125 is by comparing the contents of files based on a comparison of the code of the files, followed by the detection of similar portions of the file contents, as described above with reference to FIGS. 1 and 6. If the file type has not been identified, the module for analyzing results of antivirus scan 140 returns to step 410 and waits for the new AV scan results. Otherwise, the module 140 collects information about new file type which is used for the subsequent identification of files of the new type and sends this information to the module for adaptive modification of the antivirus database 150. In step 440, the module 150 creates an AV list for the new file type and, adds, at step 450, the newly created AV lists to the antivirus database 130. In one aspect, the newly created AV list for the new file type may be empty if no malicious files of this new file type have yet been identified. The module 150 may also add, in this step, the received information about the new file type to the list of file types, which is also stored in the antivirus database 130. The operation of the adaptive modification system 100 then terminates in step 460.

Figure 5:
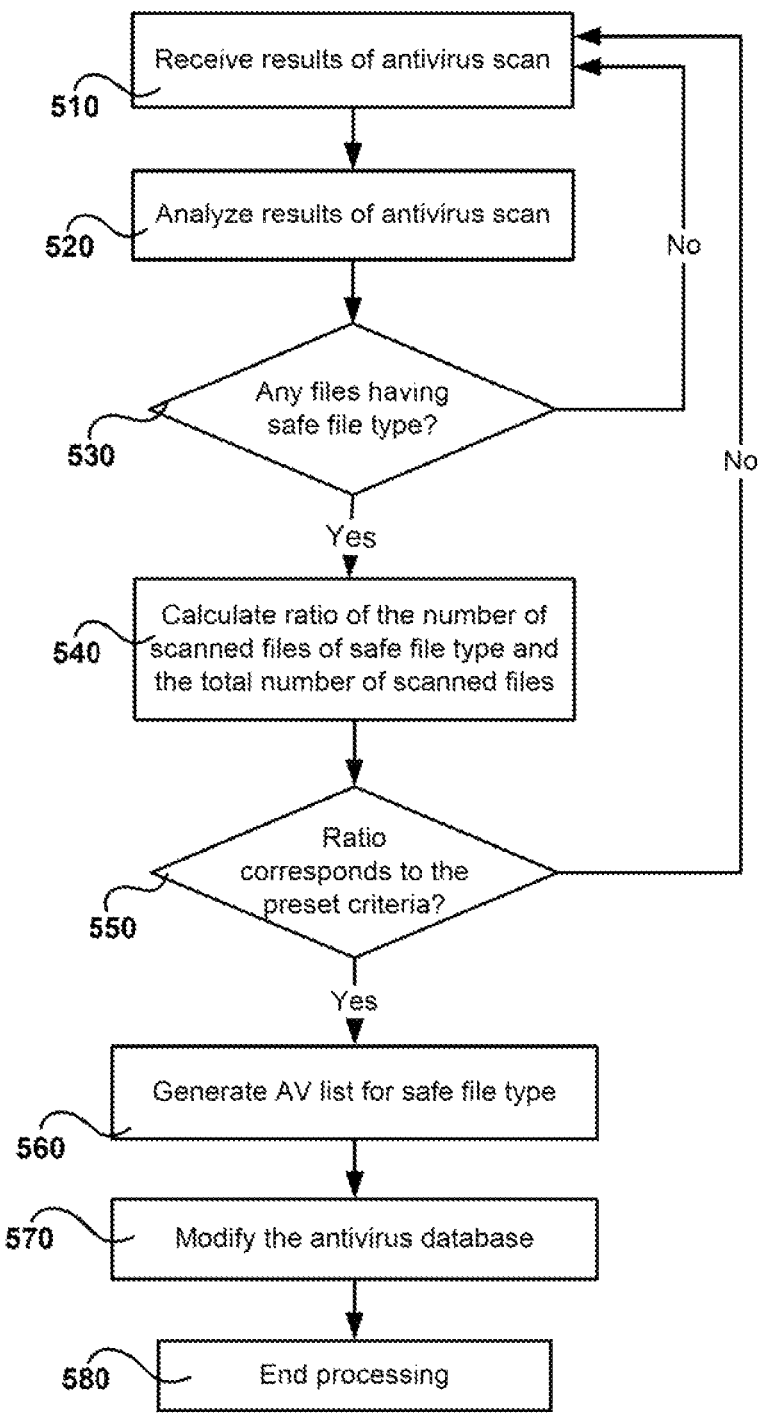
FIG. 5 is a flow diagram illustrating another example method of analysis of antivirus scan results for adaptive modification of the antivirus database.

FIG. 5 shows another example method of analysis of antivirus scan results for adaptive modification of the antivirus database. In step 510, the module for analyzing results of antivirus scan 140 receives the AV scan results (AV scan log 125) from the antivirus engine 120, and it analyzes these results in step 520. In step 530, the module 140 determines the presence of information about the files whose file type relates to the safe file types. If the information about these files has not been found, the module 140 returns to step 510 and waits for the new AV scan results. Otherwise, if the information about these files has been found, the number of checked files of a safe type and the total number of checked files of all types are counted. In step 550, the system determines whether or not the relationship between the counted files conforms to a preset criterion. This criterion may be set by the user, but in order to improve efficiency the value is tacitly set to correspond to the "10% or more" criterion, which signifies that the number of checked files of a single safe type amounts to 10% or more of the total number of checked files. If the relationship corresponds to the preset criterion, the module 140 collects the necessary information for the subsequent creation of the AV list for the next AV scan of files of the type in question, and sends this information to the module for adaptive modification of the antivirus database 150. Otherwise, if the relationship does not correspond to the preset criterion, the module 140 returns to step 510 and waits for the new AV check results (AV scan log 125). In step 560, the module for adaptive modification of the antivirus database 150 creates an AV list in accordance with the received information, which it then adds, in step 570, to the other AV lists stored in the antivirus database 130. The operation of system 100 then terminates in step 580, until next scheduled antivirus scan of file system 20.

FIG. 1 depicts ore example embodiment of a computer system 5 that can be used to implement the disclosed systems and methods for adaptive modification of antivirus database. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad, and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a computer.

In the interest of clarity, not all of the routine features of the embodiments are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A method for adaptively modifying an antivirus database, the method comprising:
   storing in the antivirus database a list of different object types comprising characteristic templates of each object type;
   receiving an antivirus scan log that contains information about software objects of an unknown object type which is not recorded in the list of object types;
   determining, by a hardware processor, whether to modify the antivirus database to include the unknown object type by:
      analyzing the antivirus scan log to identify file extensions of the software objects and isolating in a group the software objects with a same file extension;
      responsive to determining that a total number of software objects in the group is greater than a threshold number, analyzing file data of each of the software objects in the group to determine software objects with identical file portions, wherein the identical file portion is an identical sequence of bytes located in a same address offset in each of the respective software objects;
      generating a characteristic template based on the identical file portion for the software objects in the group when the number of software objects having the identical file portion is greater than a selected percentage;
   modifying the antivirus database by (i) adding to the list of object types a new object type corresponding to the characteristic template associated with the unknown object type, and (ii) adding a new antivirus list in the antivirus database based on the new object type; and
   when at least one software object having the same file extension and having the unknown object type is identified as harmful, designating as harmful the software objects associated with the new antivirus list of antivirus database.

2. The method of claim 1, further comprising:
   storing in the antivirus database a plurality of antivirus lists for different types of objects, wherein the antivirus lists include antivirus records of at least known harmful software objects of each object type;
   determining an object type of a received software object by comparing parameters of the received software object with characteristic templates of each stored object types; and
   performing an antivirus check of the received software object using the antivirus records stored in the antivirus lists corresponding to the object type of the received software object to identify a harmful software object;
   wherein the characteristic templates of each object type include one or more of a file extension, file signature, file hash sum, file size, file MIME type, file location, and a hardware or software platform of the software object.

3. The method of claim 2, wherein determining the object type of the received object further includes determining a type of a hardware or software platform of the received software object, including one of a mobile platform and a PC platform, and method further comprises determining a type and duration of the antivirus check of the object based on the type of the hardware or software platform.

4. The method of claim 2, wherein determining the object type of the received software object further includes determining a location of the software object in a file system, and determining a type and duration of the antivirus check of the object based on the location of the software object.

5. The method of claim 4, further comprising, based on the type and duration of the antivirus check, selecting one or more of signature analysis, heuristic analysis and emulation analysis.

6. The method of claim 2, wherein determining the object type of the received software object includes analyzing one or more of file structures and contents of the received software object.

7. The method of claim 1, wherein the analyzing of the file data comprises plotting in a graph a distribution of byte values of each of the software objects as a function of respective positions of the byte values in the file data.

8. A system for adaptively modifying an antivirus database, the system comprising:

a data storage configured to store in the antivirus database a list of different object types comprising characteristic templates of each object type; and a processor coupled to the data storage, the processor being configured to:

receive an antivirus scan log that contains information about software objects of an unknown object type which is not recorded in the list of object types;

determine whether to modify the antivirus database to include the unknown object type by:

analyzing the antivirus scan log to identify file extensions of the software objects and isolating in a group the software objects in a group that have with a same file extension;

responsive to determining that a total number of software objects in the group is greater than a threshold number, analyzing file data of each of the software objects in the group to determine software objects with identical file portions, wherein the identical file portion is an identical sequence of bytes located in a same address offset in each of the respective software objects;

generating a characteristic template based on the identical file portion for the software objects in the group when the number of software objects having the identical file portion is greater than a selected percentage;

modify the antivirus database by (i) adding to the list of object types a new object type corresponding to the characteristic template associated with the unknown object type, and (ii) adding a new antivirus list in the antivirus database based on the new object type; and when at least one software object having the same file extension and having the unknown object type is identified as harmful, designate as harmful the software objects associated with the new antivirus list of antivirus database.

9. The system of claim 8, wherein the data storage is further configured to store in the antivirus database containing a plurality of antivirus lists for different types of objects, wherein the antivirus lists include antivirus records of at least known harmful software objects of each object type, and the processor is configured to: determine an object type of a received software object by comparing parameters of the received software object with characteristic templates of each stored object types; and perform an antivirus check of the received software object using the antivirus records stored in the antivirus lists corresponding to the object type of the received software object to identify a harmful software object, and the characteristic templates of each object type include one or more of a file extension, file signature, file hash sum, file size, file MIME type, file location, and a hardware or software platform of the software object.

10. The system of claim 9, wherein to determine the object type of the received object the processor is further configured to determine a type of a hardware or software platform of the received software object, including one of a mobile platform and a PC platform, and to determine a type and duration of the antivirus check of the object based on the type of the hardware or software platform.

11. The system of claim 9, wherein to determine the object type of the received software object, the processor is further configured to determine a location of the software object in a file system, and determine a type and duration of the antivirus check of the object based on the location of the software object.

12. The system of claim 11, wherein the processor is further configured to, based on the type and duration of the antivirus check, select one or more of signature analysis, heuristic analysis and emulation analysis.

13. The system of claim 9, wherein to determine the object type of the received software object, the processor is further configured to analyze one or more of file structures and contents of the received software object.

14. The system of claim 13, wherein the analysis of the file data comprises plotting in a graph a distribution of byte values of each of the software objects as a function of respective positions of the byte values in the file data.

15. A computer program product embedded in a non-transitory computer-readable storage medium, the computer program product comprising computer-executable instructions for adaptively modifying an antivirus database, including instructions for:

storing in the antivirus database a list of different object types comprising characteristic templates of each object type;

receiving an antivirus scan log that contains information about software objects of an unknown object type which is not recorded in the list of object types;

determining whether to modify the antivirus database to include the unknown object type by:

analyzing the antivirus scan log to identify file extensions of the software objects and isolating in a group the software objects with a same file extension;

responsive to determining that a total number of software objects in the group is greater than a threshold number, analyzing file data of each of the software objects in the group to determine software objects with identical file portion, wherein the identical file portion is an identical sequence of bytes located in a same address offset in each of the respective software objects;

generating a characteristic template based on the identical file portion for the software objects in the group when the number of software objects having the identical file portion is greater than a selected percentage;

modifying the antivirus database by (i) adding to the list of object types a new object type corresponding to the characteristic template associated with the unknown object type, and (ii) adding a new antivirus list in the antivirus database based on the new object type; and when at least one software object having the same file extension and having the unknown object type is identified as harmful, designating as harmful the software objects associated with the new antivirus list of antivirus database.

16. The product of claim 15, further comprising instructions for:

storing in the antivirus database a plurality of antivirus lists for different types of objects, wherein the antivirus lists include antivirus records of at least known harmful software objects of each object type;

determining an object type of a received software object by comparing parameters of the received software object with characteristic templates of each stored object types; and performing an antivirus check of the received software object using the antivirus records stored in the antivirus lists corresponding to the object type of the received software object to identify a harmful software object;

wherein the characteristic templates of each object type include one or more of a file extension, file signature, file hash sum, file size, file MIME type, file location, and a hardware or software platform of the software object.

17. The product of claim 16, wherein instructions for determining the object type of the received object further include instructions for determining a type of a hardware or software platform of the received software object, including one of a mobile platform and a PC platform, and instructions for determining a type and duration of the antivirus check of the object based on the type of the hardware or software platform.

18. The product of claim 16, wherein instructions for determining the object type of the received software object further include instructions for determining a location of the software object in a file system, and determining a type and duration of the antivirus check of the object based on the location of the software object.

19. The product of claim 18, further comprising instructions for, based on the type and duration of the antivirus check, selecting one or more of signature analysis, heuristic analysis and emulation analysis.

20. The product of claim 16, wherein instructions for determining the object type of the received software object includes instructions for analyzing one or more of file structures and contents of the received software object.

* * * * *